United States Patent [19]

Baba

[11] Patent Number: 5,987,129
[45] Date of Patent: *Nov. 16, 1999

[54] METHOD OF SHARING CRYPTOKEY

[75] Inventor: Yoshimi Baba, Funabashi, Japan

[73] Assignee: Card Call Service Co., Ltd., Tokyo, Japan

[*] Notice: This patent is subject to a terminal disclaimer.

[21] Appl. No.: 08/804,380

[22] Filed: Feb. 21, 1997

[30] Foreign Application Priority Data

| Feb. 21, 1996 | [JP] | Japan | ................................. | 8-070832 |
| Feb. 21, 1996 | [JP] | Japan | ................................. | 8-070835 |
| Jul. 8, 1996 | [JP] | Japan | ................................. | 8-210376 |

[51] Int. Cl.$^6$ ....................................................... H04L 9/08
[52] U.S. Cl. .............................................. 380/21; 380/28
[58] Field of Search .................................. 380/21, 28, 29, 380/30, 44, 45, 46; 395/188.01; 713/202, 201

[56] References Cited

U.S. PATENT DOCUMENTS

| 5,016,276 | 5/1991 | Matsumoto et al. | ....................... | 380/45 |
| 5,202,921 | 4/1993 | Herzberg et al. | .......................... | 380/23 |
| 5,606,615 | 2/1997 | Lapointe et al. | ........................... | 380/25 |
| 5,729,609 | 3/1998 | Moulart et al. | ............................. | 380/21 |
| 5,778,069 | 7/1998 | Tomlinson et al. | ....................... | 380/25 |

FOREIGN PATENT DOCUMENTS

| 63-314585 | 12/1988 | Japan . |
| 5-48980 | 7/1992 | Japan . |
| 7-175411 | 7/1995 | Japan . |
| 7-311673 | 11/1995 | Japan . |

OTHER PUBLICATIONS

R. Blom, "An Optimal Class of Symmetric Key Generation Systems," Lecture Notes in Computer Science, Advances in Cryptology, 1985, pp. 335–338.

R. Blom, "Non–Public Key Distribution," Advances in Cryptology, Proceedings of Crypto 82, Plenum Press, New York, N.Y., pp. 231–236.

T. Matsumoto et al., "Performance of Linear Schemes for the Key Predistribution System," IEICE Technical Report on Information Security, May 20, 1988.

M. Mitani et al., "Digital Signal Processing Series vol. 3 Digital Filter Design", Shokodo, Apr. 20, 1987, pp. 75–78.

T. Matsumoto et al., "A Method for Sharing Cryptography Key Without Communication: Key Predistribution System", Trans. of IEICE, vol. J71–A, No. 11, Nov. 25, 1988, pp. 2046–2053.

T. Matsumoto et al., "Performance of Linear Schemes for the Key Predistribution System", IEICE Technical Report ISEC88–5, Inst. of Elec., Info. and Comm. Engineers of Japan, vol. 88, No. 33, May 20, 1988, pp. 29–32.

H. Imai, "Coding Theory", IEICE, 5th ed., Jun. 10, 1994, pp. 158–159.

J. Massey et al., "A Fourier Transform Approach to the Linear complexity of Nonlinearly Filtered Sequences", Advances in Cryptology: Proceedings of CRYPTO97, Springer–Verlag (1994), pp. 332–340.

*Primary Examiner*—Pinchus M. Laufer
*Attorney, Agent, or Firm*—Paul A. Guss

[57] ABSTRACT

In a center, a Fourier transformation with a weighting function and a center matrix are applied to the identifier of each entity (steps 2-1, 2-2), which is then randomized by one-time pass random number data generated by a manual operation at each entity, thereby generating a secret private key peculiar to each entity (steps 2-3~2-5). The center also generates an identifier transformation algorithm based on the one-time pass random number data and the Fourier transformation with a weighting function (step 2-6). Thereafter, the center distributes the identifier transformation algorithm and the secret private key to each entity. Each entity applies the identifier transformation algorithm and the secret private key to the identifier of another entity with which to communicate, for thereby generating a common cryptokey for cryptographic communications between the entities.

13 Claims, 8 Drawing Sheets

FIG. 6 (TRANSMITTING SIDE)

FIG. 7
(RECEIVING SIDE)

METHOD OF SHARING CRYPTOKEY

BACKGROUND OF THE INVENTION

1. Field of the Invention

The present invention relates to a method of sharing a cryptokey for cryptographic communications between entities on a computer network.

2. Description of the Prior Art

Recent years have seen a pressing need for ciphertext communication technology to keep communication data secret from third parties for communications on a network such as the Internet.

One well known type of such ciphertext communication technology is a form of public key cryptography known as RSA. Another form of ciphertext communication technology which is generally known in the art is a process of sharing a cryptokey used for communications between entities on a network. According to such a process of sharing a cryptokey, a transmitting entity encrypts communication data of a plaintext using a cryptokey and then transmits the cryptographic communication data to a receiving entity. Then, the receiving entity decrypts the received cryptographic communication data back into the original communication data, using the same cryptokey as the cryptokey used by the transmitting entity. The term "entity" used above signifies any existing body for carrying out communications, e.g., a device such as a terminal connected to the network, a user of the device, a program for operating the device, a combination thereof, or the like.

Conventional attempts to realize the process of sharing a cryptokey are disclosed in "NON-PUBLIC KEY DISTRIBUTION/Advances in Cryptography: Proceedings of CRYPTO '82/Plenum Press, 1983, pp. 231–236" by Rolf Blom, "An Optimal Class of Symmetric Key Generation Systems/Advances in Cryptology: EUROCRYPT '84/ Springer LNCS 209, 1985, pp. 335–338" by Rolf Blom, Japanese patent publication No. 5-48980, and U.S. Pat. No. 5,016,276, for example.

According to the above disclosed proposals, a center or central facility established on the network generates a secret private key for each of the entities for generating a common cryptokey and distributes the generated secret private key to each of the entities. When the entities communicate with each other, each of the entities applies its own secret private key to the other entity's identifier (name, address, or the like), generating a common cryptokey shared by the entities.

In the above process, the secret private key for each of entities is generated by transforming the identifier of each entity according to a center algorithm which is held by the center only and common to the entities.

More specifically, if the center algorithm is expressed as a function $P(x, y)$ of variables $x$, $y$ representing two arbitrary identifiers, respectively, then the center algorithm is established so that it has a symmetry represented by $P(x, y)=P(y, x)$. A function $P(x, i)$ (hereinafter expressed as "$Pi(x)$") which is generated when the actual identifier $i$ of each of the entities is substituted in the value of the variable $y$, for example, of the variables $x$, $y$ of the function $P(x, y)$ is distributed as a secret private key to each entity. When the entity having the identifier $i$ subsequently communicates with the entity having the identifier $j$, the entity having the identifier $i$ applies the identifier $j$ of the other entity to its own secret private key $Pi(x)$, i.e., sets the variable $x$ to "$j$", thus generating a cryptokey $Pi(j)$. Similarly, the entity having the identifier $j$ applies the identifier $i$ of the other entity to its own secret private key $Pj(x)$, thus generating a cryptokey $Pj(i)$. Since the center algorithm has the above symmetry, the cryptokey $Pi(j)$ is equal to the cryptokey ($Pi(j)=Pj(i)$). Therefore, the entities having the respective identifiers $i$, $j$ have obtained a common cryptokey.

With the above process of sharing a cryptokey, each entity can obtain a cryptokey common to itself without any other arbitrary entity involving the center simply by applying the identifier of the arbitrary entity to its own secret private key. Consequently, the above process of sharing a cryptokey is effective to simplify a cryptosystem on a computer network.

According to the above process of sharing a cryptokey, it is important that the center algorithm should not easily be analyzed in order to keep ciphertexts secret.

While the above process of sharing a cryptokey offers the advantages described above, the secret private keys of respective entities, a cryptokey generated from the secret private keys, and communication data encrypted by the cryptokey thus generated all contain information regarding the center algorithm. Because the center algorithm is common to the entities, it is generally open to attack by a plurality of collaborating entities as described in "Performance of Linear Schemes for the Keypredistribution System/IEICE Technical Report on Information Security, May 20, 1988, pp. 29–32" by Matsumoto.

If entity names are used as identifiers, then since many similar names tend to occur, the identifiers are not well dispersed, i.e., the distribution of the identifiers is liable to be localized. Many of the secret private keys of the entities which are produced by applying the center algorithm to those identifiers tend to be analogous to each other. As a result, cryptographic communication data are subject to so-called differential attack.

Consequently, there has been a demand for increased security against various forms of attack against the above process of sharing a cryptokey.

SUMMARY OF THE INVENTION

It is therefore an object of the present invention to provide a method of sharing a cryptokey for increased security against various forms of attack while simplifying the generation of a common cryptokey for cryptographic communications and a cryptosystem on a computer network.

To achieve the above object, there is provided in accordance with a first aspect of the present invention a method of sharing a common cryptokey for encrypting and decrypting communication data between entities in a network which includes a plurality of entities and a center, comprising the steps of generating, in the center, a secret private key peculiar to each of the entities by transforming an identifier which is peculiar to each of the entities and which is public, according to a center algorithm which is held by the center only and common to the entities and which includes at least an integral transformation algorithm, and distributing, from the center, the secret private key and the integral transformation algorithm to each of the entities, and when the entities communicate with each other, applying, in each of the entities, the integral transformation algorithm and the secret private key which are possessed by each of the entities to the identifier of the other entity thereby to generate a common cryptokey, so that the entities will possess the common cryptokey shared by the entities.

Since the secret private key of each of the entities is generated in the center by transforming the identifier of each of the entities according to the center algorithm including the integral transformation algorithm, the data produced when the integral transformation algorithm is applied to the identifier are made highly dispersive even if the identifiers of the entities are not well dispersed. Consequently, the secret private keys are also made highly dispersive. Therefore, the secret private keys which are less analogous than heretofore are generated for the respective entities by the center, and distributed together with the integral transformation algorithm to the respective entities. For communications between entities, the integral transformation algorithm and the secret private key which are possessed by each of the entities are applied in each of the entities to the identifier of the other entity thereby to generate a common cryptokey. Since the secret private key of each entity contains elements based on the integral transformation algorithm, when not only the secret private key but also the integral transformation algorithm are applied to the identifier of the other entity, the common cryptokey which is common to the entities which are going to communicate with each other is generated by an algorithm portion (which is assumed to be symmetric as described above) of the center algorithm which precludes the integral transformation algorithm.

With the first aspect of the present invention, therefore, as the identifier of each entity is transformed by the center algorithm including the integral transformation algorithm for thereby generating the secret private key peculiar to each entity and used to generate a common cryptokey for communications, the secret private keys of the entities are made highly dispersive, resulting in increased security against differential attack or the like. For communications, only the identifier of the other entity with which to communicate is applied to the integral transformation algorithm and the secret private key which are owned by each entity for thereby generating a common cryptokey shared by the entities which are going to communicate with each other, without involving the center.

According to the first aspect of the present invention, a cryptosystem on the network is made highly secure against various forms of attack, such as differential attack, while simplifying the generation of a common cryptokey and the arrangement of the cryptosystem, and is also made simple and highly reliable.

The identifier may be the name, address, the mail address or domain name thereof on the network, or their combination of each entity insofar as it is peculiar to each entity and is public to at least an entity with which to communicate.

The integral transformation algorithm may be a Fourier transformation (including a fast Fourier transformation), a Laplace transformation, a Miller transformation, a Hilbert transformation, or the like. While either one of these transformations may be used, these integral transformations are defined in a analytically infinite interval. Since the identifier to be transformed by the integral transformation algorithm according to the first aspect of the present invention is expressed in a finite interval (e.g., a coset on a finite ring), when the data of the identifier is subjected to the integral transformation using a computer or the like, the transformed data tend to suffer aliasing.

According to the first aspect of the present invention, therefore, the integral transformation algorithm preferably comprises an integral transformation algorithm with a weighting function. The aliasing can be prevented by adding such a weighting function when the identifier is subjected to the integral transformation. Since the weighting function may be established arbitrarily insofar as it is capable of preventing aliasing, the secret private key generated when the identifier is transformed by the center algorithm which includes the integral transformation algorithm with the weighting function contains unknown elements based on the weighting function. As a consequence, the security of the cryptosystem to which the first aspect of the present invention is applied is increased.

The weighting function thus added is basically established such that its value approaches "0" at ends of the interval of the data of the identifier. According to the first aspect of the present invention, the weighting function is determined in an unpredictable pattern by random number data generated in the center. More preferably, the random number data comprise one-time pass random number data. The weighting function is determined by the random number data by determining the manner in which the value of the weighting function varies in the interval of the data of the identifier, i.e., the manner in which the weighting function approaches "0" at the ends of the interval of the data of the identifier, using the random number data. The one-time pass random number data are random number data which are not reproducible or hardly reproducible. More specifically, the one-time pass random number data are random number data whose bit values appear at equal frequencies and which are not correlated. Such random number data can be generated based on the timing with which a phrase or a sentence is manually entered into a computer by a human operator.

With the weighting function thus determined in an unpredictable pattern, a person who attacks the cryptosystem finds it difficult to predict the weighting function. Therefore, the security of the cryptosystem to which the first aspect of the present invention is applied is increased. Particularly, if the weighting function is determined by the one-time pass random number data, the security of the cryptosystem is further increased as the reproducibility of the random number data is eliminated.

While the integral transformation algorithm may be of any of various forms, the integral transformation algorithm preferably comprises a Fourier transformation algorithm in the first aspect of the present invention. The Fourier transformation is an integral transformation which can quickly and easily be carried out by a computer, and data transformed by the Fourier transformation generally tend to be dispersed. If a Fourier transformation algorithm is used as the integral transformation algorithm, then the secret private key can quickly and easily be generated from the identifier, and the secret private keys of the entities are effectively made highly dispersive for there by increasing the security of the cryptosystem.

According to the first aspect of the present invention, furthermore, the method further comprises the steps of randomizing, in the center, the identifier transformed by the center algorithm, with one-time pass personal random number data which are peculiar and unknown to each of the entities, thereby to generate the secret private key, and distributing, from the center, an algorithm for canceling out the elements of the randomization which are contained in the secret private key and an identifier transformation algorithm which comprises the integral transformation algorithm, to each of the entities, and when the entities communicate with each other, applying, in each of the entities, the identifier transformation algorithm and the secret private key which are possessed by each of the entities to the identifier of the other entity thereby to generate the common cryptokey, so that the entities will possess the common cryptokey shared by the entities.

The randomization or random transformation is carried out by modifying the values of the bits of a sequence of data representing the identifier transformed by the center algorithm, with the one-time pass personal random number data, or rearranging the sequence of data, or both modifying the values of the bits of the sequence of data and rearranging the sequence of data.

Therefore, the secret private key contains elements due to the random transformation in addition to the center algorithm. Since the random transformation is effected using the one-time pass personal random number data (random number data which are not reproducible or hardly reproducible) which are peculiar and unknown to each entity, the secret private key of each entity contains accidental elements. As a result, the security of the cryptosystem against various forms of attack is further strengthened.

The secret private key to be applied to the identifier of the other entity contains elements due to the random transformation. Therefore, the identifier transformation algorithm which includes the algorithm for canceling out those elements and the integral transformation algorithm is distributed together with the secret private key to each entity. For communications, the identifier transformation algorithm and the secret private key are applied to the identifier of the other entity for thereby generating a common cryptokey shared by the entities which are going to communicate with each other.

The identifier transformed by the center algorithm is randomized by rearranging a sequence of data representing the identifier transformed by the center algorithm, with the one-time pass personal random number data.

More preferably, the sequence of data contains a plurality of unnecessary bits, and the identifier transformed by the center algorithm is randomized by randomizing the values of the unnecessary bits with the one-time pass personal random number data and further rearranging the sequence of data, including the unnecessary bits, in its entirety.

Because the values of the unnecessary bits of the sequence of data which represents the identifier transformed by the center algorithm are randomized with the one-time pass personal random number data, and the sequence of data, including the unnecessary bits, is rearranged in its entirety, a person who attacks, i.e., attempts to analyze, the cryptosystem is unable to comprehend which part of the acquired data contains the unnecessary bits and which part of the acquired data contains necessary data. The cryptosystem is thus highly secure against such attack.

The one-time pass personal random number data are generated according to a given process of each of the entities, preferably, a manual data entering process, and the one-time pass personal random number data are generated based on the timing of the manual data entering process.

Inasmuch as the random number data are generated based on the timing with which a phrase or a sentence is manually entered into a computer by a human operator, the generated random number data are not reproducible or hardly reproducible. The one-time pass personal random number data can thus appropriately be generated.

According to a second aspect of the present invention, there is provided a method of sharing a common cryptokey for encrypting and decrypting communication data between entities in a network which includes a plurality of entities and a center, comprising the steps of generating, in the center, a secret private key peculiar to each of the entities by transforming an identifier which is peculiar to each of the entities and which is public, according to a center algorithm which is held by the center only and common to the entities, and then randomizing the transformed identifier with one-time pass personal random number data which are peculiar and unknown to each of the entities, and distributing, from the center, the secret private key and an identifier transformation algorithm which includes an algorithm for canceling out the elements of the randomization which are contained in the secret private key to each of the entities, and when the entities communicate with each other, applying, in each of the entities, the identifier transformation algorithm and the secret private key which are possessed by each of the entities to the identifier of the other entity thereby to generate a common cryptokey, so that the entities will possess the common cryptokey shared by the entities.

Since the secret private key of each of the entities is generated in the center by randomizing the identifier of each of the entities transformed according to the center algorithm (which contains a portion assumed to be symmetric as described above), with the one-time pass personal random number data (random number data that are not reproducible or hardly reproducible), the secret private key of each entity contains accidental elements. As a result, the cryptosystem to which the second aspect of the present invention is applied is made highly secure against various forms of attack. As with the first aspect of the present invention, the secret private key of each entity contains elements due to the random transformation. Therefore, the identifier transformation algorithm including an algorithm for canceling out those elements and the secret private key are distribute to each entity. For communications between entities, the identifier transformation algorithm and the secret private key are applied in each of the entities to the identifier of the other entity thereby to generate a common cryptokey shared by the entities, without involving the center.

According to the second aspect of the present invention, therefore, a cryptosystem on the network is made highly secure against various forms of attack, such as differential attack, while simplifying the generation of a common cryptokey and the arrangement of the cryptosystem, and is also made simple and highly reliable.

With the second aspect of the present invention, as with the first aspect of the present invention, the identifier transformed by the center algorithm is randomized by rearranging a sequence of data representing the identifier transformed by the center algorithm, with the one-time pass personal random number data. More preferably, the sequence of data contains a plurality of unnecessary bits, and the identifier transformed by the center algorithm is randomized by randomizing the values of the unnecessary bits with the one-time pass personal random number data and further rear-ranging the sequence of data, including the unnecessary bits, in its entirety. The security of the cryptosystem to which the second aspect of the present invention is thus increased.

With the second aspect of the present invention, as with the first aspect of the present invention, furthermore, the one-time pass personal random number data are generated according to a given process of each of the entities. More specifically, the given process comprises a manual data entering process, and one-time pass personal random number data are generated based on the timing of the manual data entering process. The one-time pass personal random number data can thus appropriately be generated.

The above and other objects, features, and advantages of the present invention will become apparent from the following description when taken in conjunction with the accompanying drawings which illustrate a preferred embodiment of the present invention by way of example.

DETAILED DESCRIPTION OF THE PREFERRED EMBODIMENT

A cryptosystem to which a method of sharing a cryptokey according to the present invention is applied will first be described below with reference to FIGS. 1 and 2.

Figure 1:
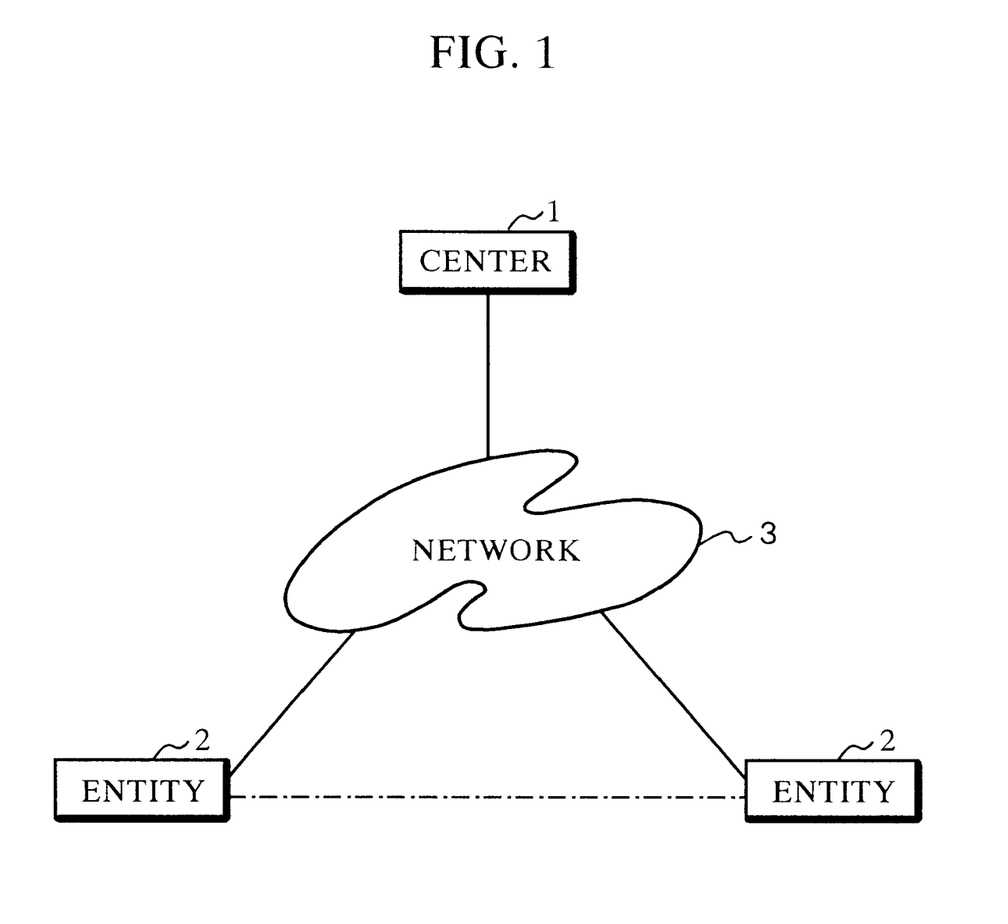
FIG. 1 is a block diagram of a cryptosystem to which a method of sharing a cryptokey according to the present invention is applied.

As shown in FIG. 1, the cryptosystem includes a center or central facility 1, which is a basic main constituent of the system, a plurality of entities 2 which are subscribed to the cryptosystem for communication with each other, and a network 3 such as the Internet, a personal computer communication network, or the like through which the center 1 and the entities 2 are connected to communicate with each other. The center 1 and the entities 2 include computers such as personal computers for effecting actual communications and data processing and users of those computers.

Figure 2:
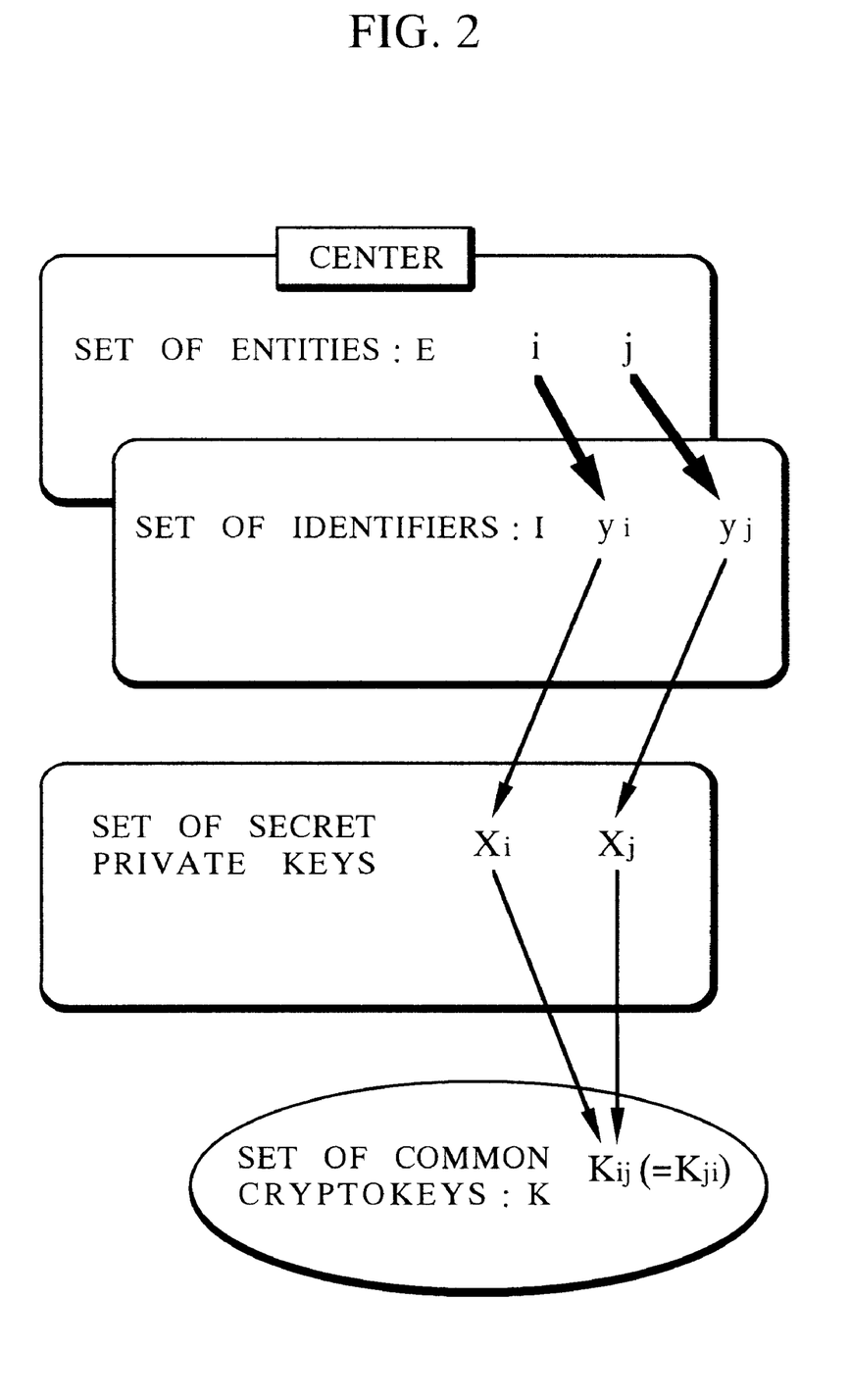
FIG. 2 is a block diagram showing the concept of a basic structure of the cryptosystem shown in FIG. 1.

In the cryptosystem on the network 3, as shown in FIG. 2, the entities 2 (represented by i, j, . . . in FIG. 2) have respective peculiar identifiers yi, yj, . . . (described in detail later on). If i≠j, then yi≠yj. The entities 2 (i, j, . . . ) have been given, by the center 1, respective secret private keys Xi, Xj, . . . (described in detail later on and hereinafter referred to as a "secret private key Xn" if necessary) which are peculiar to the respective entities 2 and generated by the center 1 based on the respective identifiers yi, yj, . . . (hereinafter referred to as an "identifier yn" if necessary). For cryptographic communications between any arbitrary entities i, j, a common cryptokey Kij for encrypting communication data (on the transmitting side) and decrypting communication data (on the receiving side) is generated for the entities i, j using the secrete private keys Xi, Xj of the entities i, j. Using the generated common cryptokey Kij, the encrypted communications are carried out between the entities i, j.

Prior to describing the cryptosystem in detail, the identifier yn will first be described below. In this embodiment, the identifier yn of each entity 2 may comprise any attribute which is public and peculiar to each entity 2, e.g., the name, address, mail address or domain name on the network, or their combination of each entity 2. Actually, the center 1 and the computer of each entity 2 handle the identifier yn as vector data which have been encoded by a coset on a finite ring.

The cryptosystem for carrying out the above cryptographic communications will be described below in detail with reference to FIGS. 3 through 8.

Figure 3:
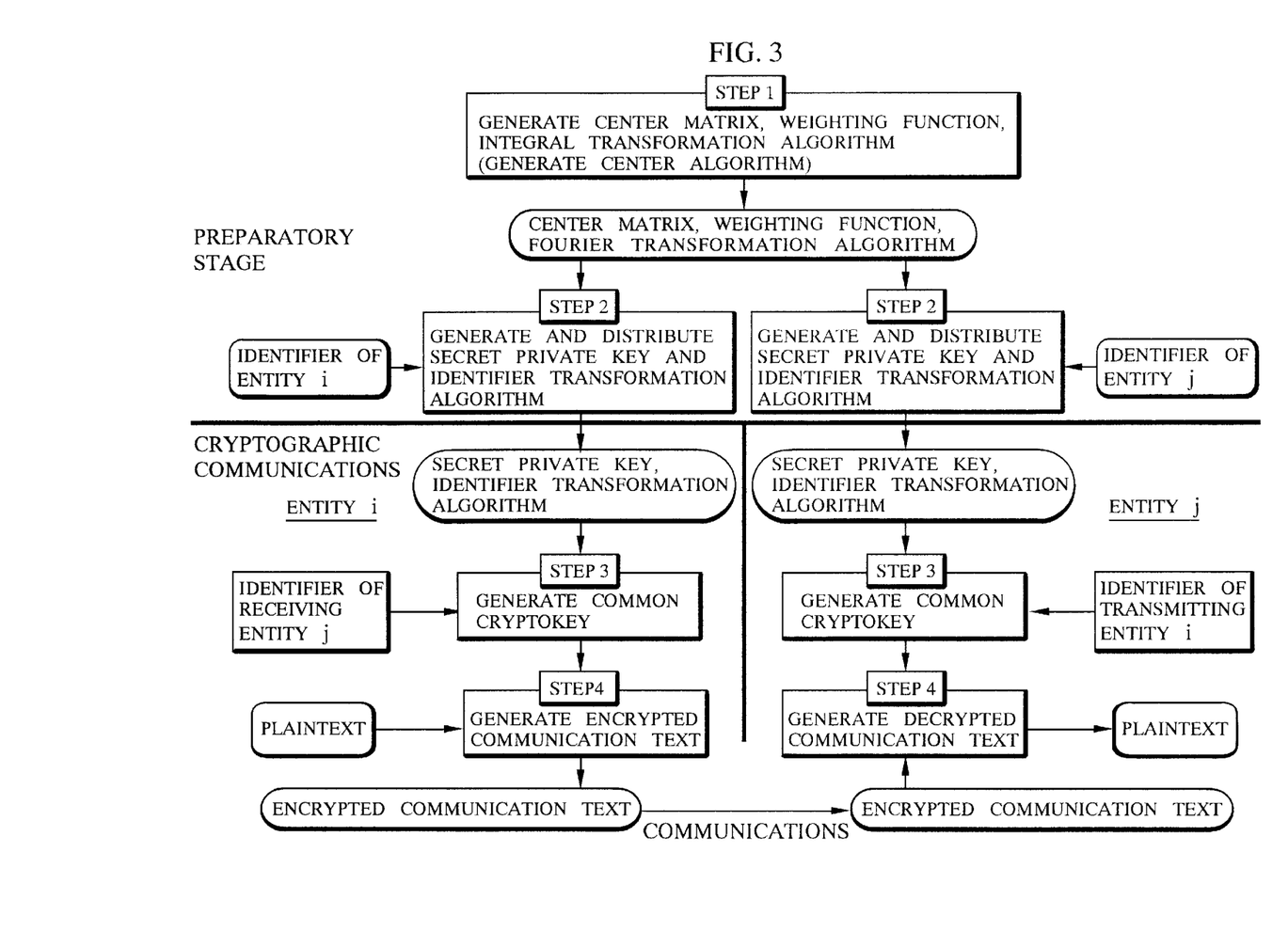
FIG. 3 is a flowchart of an operation sequence of the cryptosystem shown in FIG. 1.

As shown in FIG. 3, cryptographic communications are carried out between the entities i, j after the center 1 generates and distributes the secret private key Xn in a preparatory stage.

In the preparatory stage, the center 1 generates a center algorithm which serves as a basis for generating the secret private key Xn of each entity when the center 1 is established or the cryptosystem is updated (step 1).

In this embodiment, the center algorithm comprises a center matrix, a weighting function, and an integral transformation algorithm.

The integral transformation algorithm is an algorithm for producing an integral transform of the data of the identifier yn of each entity 2. In this embodiment, a Fourier transformation (more specifically, a fast Fourier transformation) is used as the integral transformation algorithm. Various Fourier transformations are known in the art, and one of the Fourier transformations is selected by the center 1 to generate a Fourier transformation algorithm which is used in the embodiment. The Fourier transformation algorithm is actually expressed as a matrix to process the data of the identifier yn.

The weighting function serves to prevent aliasing in the Fourier transformation of the identifier yn, which is data in a finite interval. The weighting function is a function whose value approaches "0" at ends of the interval of the data of the identifier yn. The center matrix is a symmetric matrix, and more specifically, a nonsingular symmetric matrix.

Figure 4:
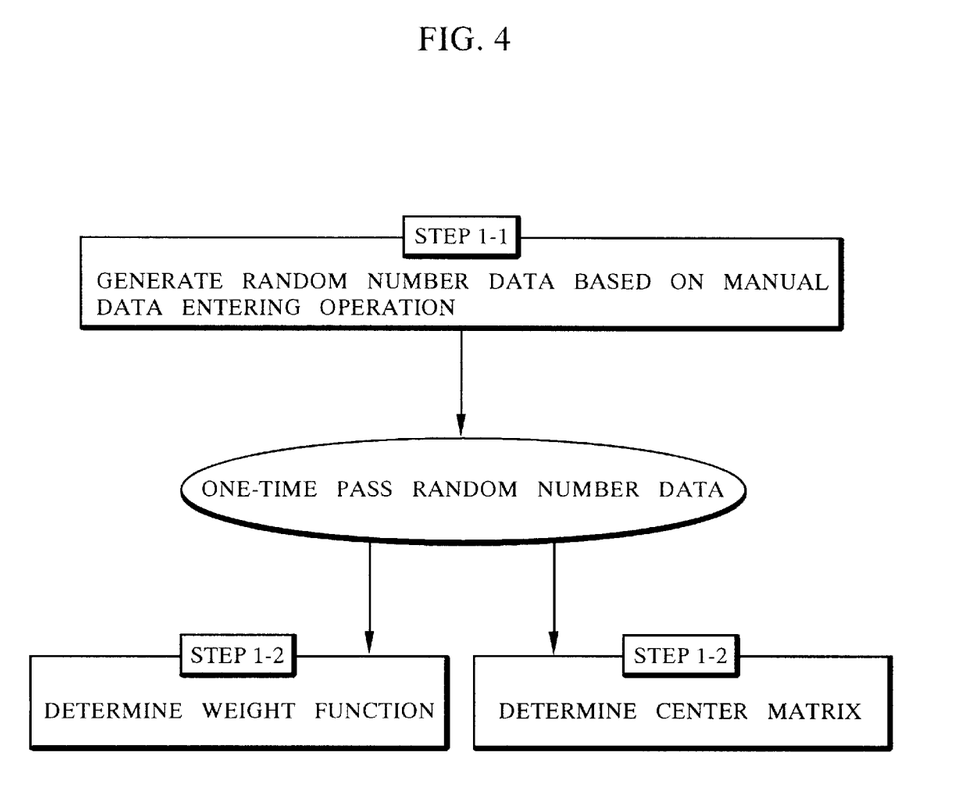
FIG. 4 is a flowchart showing details of a step 1 in the operation sequence shown in FIG. 3.

The weighting function and the center matrix are generated using one-time pass random number data. Specifically, for generating the weighting function and the center matrix, as illustrated in FIG. 4, the center 1 generates random number data based on manual operation of the operator at the computer in the center 1 (step 1-1). More specifically, the operator enters a suitable phrase, sentence, or the like into the computer of the center 1, and the computer sequentially measures the timing of the entered data, i.e., times at which the respective words are entered or time intervals at which the respective words are entered. The computer then generates random number data in a time series based on the measured timing of the entered data. Since the random number data thus generated are based on the timing of the entered data depending on the manual operation which contains elements of uncertainty, the random number data actually lack reproducibility and are accidental. Therefore, the random number data are one-time pass data.

After having generated one-time pass random number data, the center 1 determines the weighting function and the center matrix based on the generated one-time pass random number data (step 1-2). Specifically, the center 1 determines the weighting function by determining the manner in which the value of a weighing function varies in the interval of the data of the identifier yn, i.e., the manner in which a weighing function approaches "0" at the ends of the interval of the data of the identifier yn, using the one-time pass random number data. The weighting function is thus determined in a pattern which is unpredictable. In reality, the weighting function is expressed as a diagonal matrix. The center 1 determines the center matrix by determining the values of elements of the matrix using the one-time pass random number data while keeping the matrix symmetric and nonsingular.

The center algorithm which comprises the center matrix, the weighting function, and the integral transformation algorithm thus generated is stored in secrecy in the center 1. Particularly, the center matrix and the weighting function are kept in strictly secure storage such that they cannot be referred to by third parties (including the entities 2) other than those specified by the center 1. The center algorithm is common to the entities 2.

Referring back to FIG. 3, when the entities 2 (i, j, . . . ) are subscribed to the cryptosystem, the center 1 generates a secret private key Xn peculiar to each of the entities 2 and an identifier transformation algorithm for generating a common cryptokey Kij as described later on, using the center algorithm stored in the center 1 and the identifier yn of each of the entities 2, and distributes the secret private key Xn and the identifier transformation algorithm to each of the entities 2 (step 2).

Figure 5:
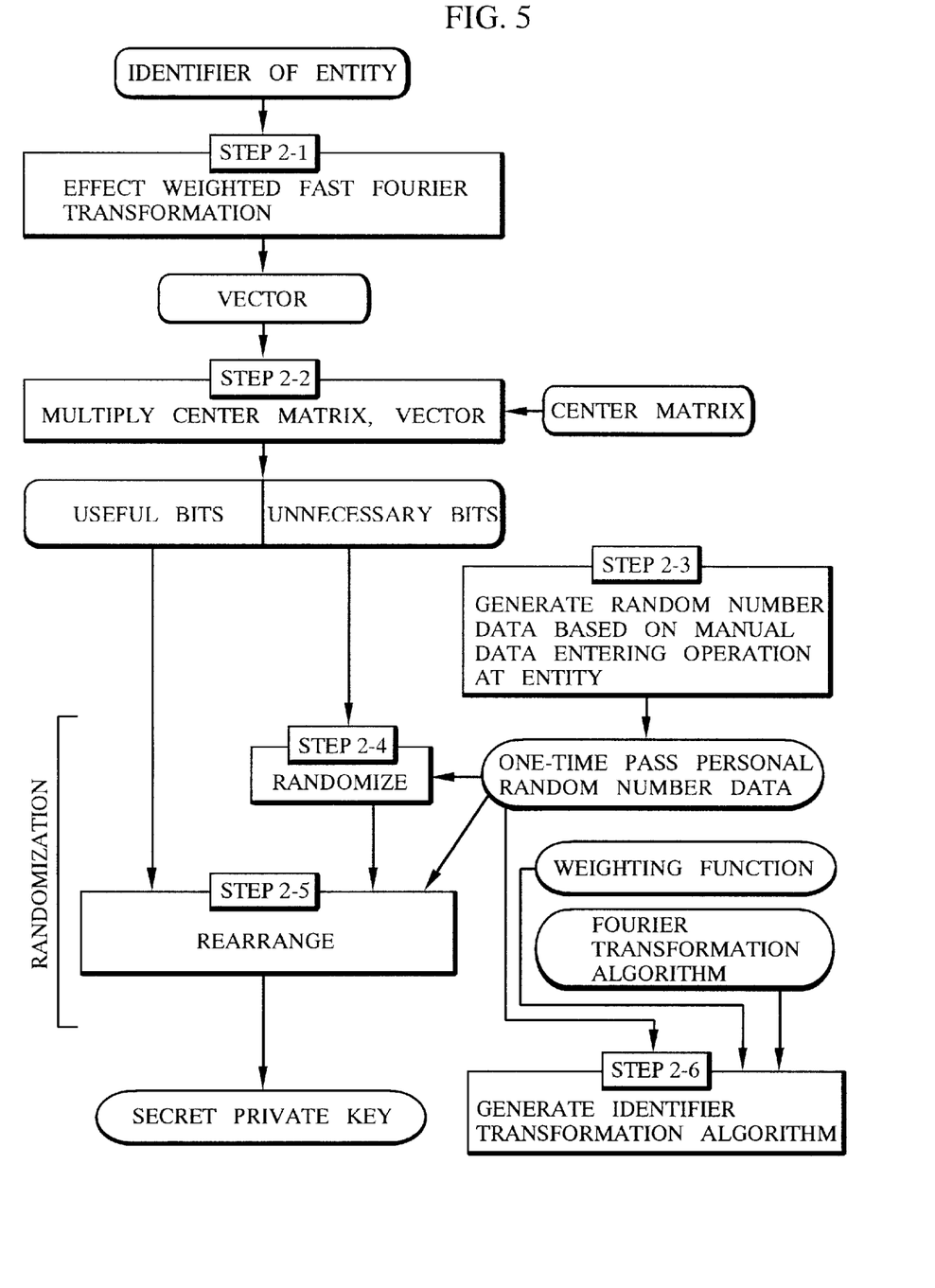
FIG. 5 is a flowchart showing details of a step 2 in the operation sequence shown in FIG. 3.

Specifically, in the step 2, as shown in FIG. 5, the center 1 applies the Fourier transformation algorithm and the matrix of the weighting function to the data (vector data) of the identifier yn of each entity 2, thereby effecting a Fourier transformation with a weighting function on the identifier yn (step 2-1). Then, the center 1 multiplies the vector data produced in the step 2-1 by the center matrix (step 2-2). The data of the identifier yn are made redundant, so that the vector data produced in the step 2-2 contain a plurality of useful bits generated by applying the weighting function, the integral transformation algorithm, the center matrix, and a plurality of other unnecessary bits, in the form of a bit train, which is data representative of the identifier yn.

At the time the center 1 communicates with each entity 2, e.g., in a subscription process for the entity 2, the center 1 generates one-time pass personal random number data which are peculiar to the entity 2 and are not known to the entity 2 (step 2-3). Specifically, in the same manner as when the center 1 has generated one-time pass random number data for determining the weighting function and the center matrix, the operator enters a suitable phrase, sentence, or the like from the computer of the entity 2, and the center 1 sequentially receives the entered data. The computer of the center 1 measures the timing of the entered data. The computer of the center 1 then generates personal random number data based on the measured timing of the entered data. As with the one-time pass random number data generated for determining the weighting function and the center matrix, the one-time pass personal random number data lack reproducibility and are accidental. Therefore, the personal random number data are peculiar to the entity 2 and are one-time pass data. Inasmuch as the timing of the manually entered data cannot accurately be controlled, the entity 2 is unable to know the personal random number data.

Then, the center 1 randomizes the respective values of the unnecessary bits of the vector data produced in the step 2-2, with the one-time pass personal random number data generated in the step 2-3 (step 2-4). Then, the center 1 randomly rearranges vector data, which are composed of the randomized unnecessary bits and the useful bits, i.e., changes the arrangement of the vector data, with the one-time pass personal random number data (step 2-5). In this manner, the center 1 randomizes the vector data (transformed from the identifier yn by the center algorithm) generated in the step 2-2. The center 1 then uses the randomized vector data as the secret private key Xn of each of the entities 2. The above randomization or random transformation is expressed as a matrix (which may not necessarily be a symmetric matrix), and more particularly as a matrix whose transposed matrix and inverse matrix are equal to each other.

The center 1 generates the identifier transformation algorithm from the one-time pass personal random number data, the Fourier transformation algorithm, and the weighing function (step 2-6). The identifier transformation algorithm is generated by combining an algorithm (expressed as the inverse of the matrix which represents the random transformation) for canceling out the elements of the random transformation which are reflected in the secret private key Xn, the Fourier transformation algorithm, and the weighing function, i.e., by multiplying the matrixes representing the algorithm, the Fourier transformation algorithm, and the weighing function.

The secret private key Xn of each entity 2 and the identifier transformation algorithm, which are thus generated by the center 1, are distributed to each entity 2 through communications (see the step 2 in FIG. 3).

The details of the preparatory stage in the center 1 have been described above.

After having generated the secret private key Xn of each entity 2 and the identifier transformation algorithm, the center 1 does not store, but deletes, the one-time pass personal random number data corresponding to each entity 2 and the matrix representing the random transformation. When each entity 2 receives the secret private key Xn and the identifier transformation algorithm, it stores them secretly in a suitable storage device of its own computer.

After the preparatory stage, a cryptographic communication process is carried out between any arbitrary entities 2 as described below. It is assumed that a cryptographic communication process is carried out between entities i, j (i≠j) with the entity i as the transmitting entity and the entity j as the receiving entity.

In the cryptographic communication process, the transmitting entity i generates a common cryptokey Kij shared by itself and the receiving entity j from the secret private key Xi and the identifier transformation algorithm which are held by the transmitting entity i and the identifier yj of the receiving entity j (step 3).

Figure 6:
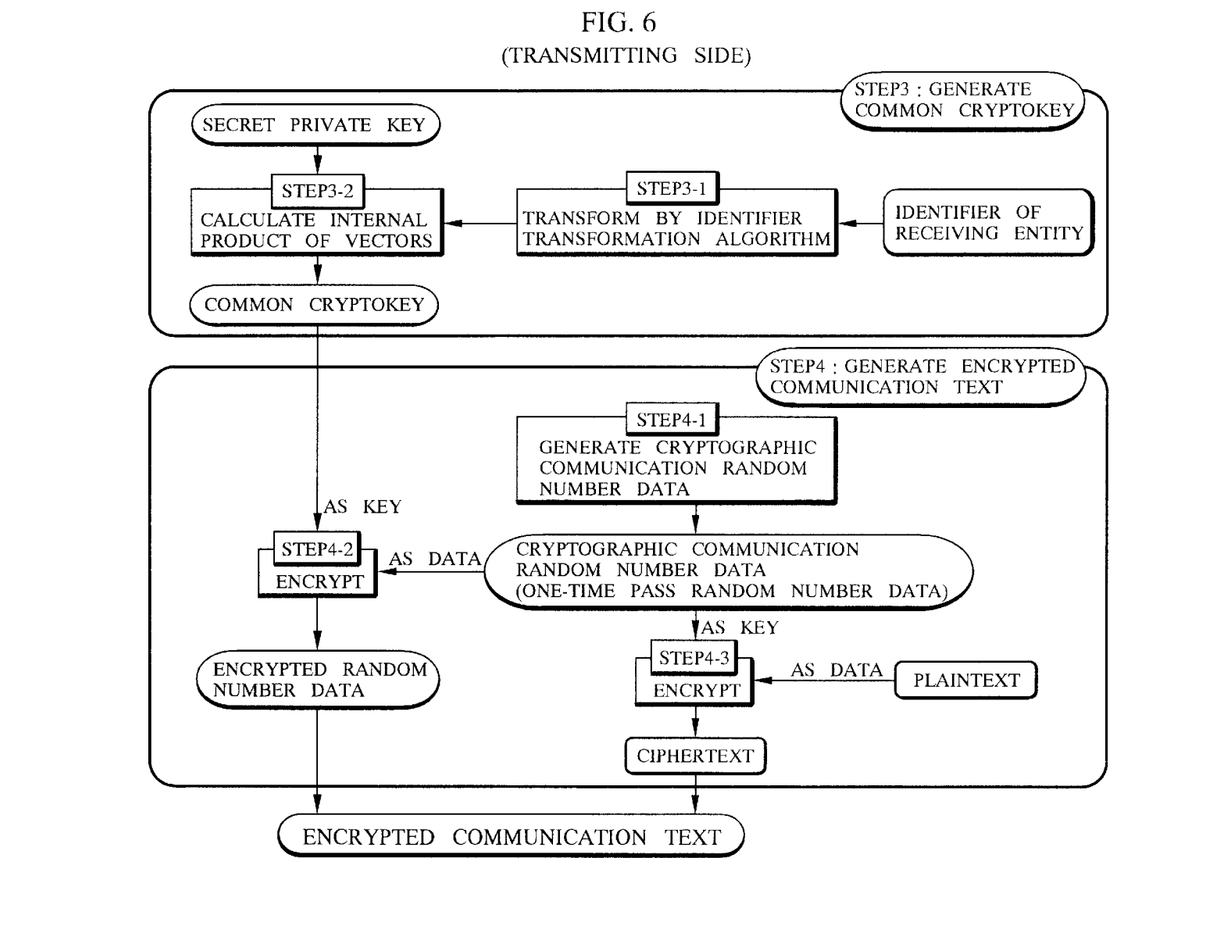
FIG. 6 is a flowchart showing details of steps 3 and 4 in the operation sequence shown in FIG. 3.

Specifically, as shown in FIG. 6, the transmitting entity i applies the identifier transformation algorithm of the entity i on the computer of the entity i to the identifier yj of the receiving entity j, i.e., multiplies the vector data of the identifier yj by the matrix of the identifier transformation algorithm (step 3-1). Then, the transmitting entity i calculates an inner product of the vector data generated in the step 3-1 and the secret private key Xi (vector data) of the transmitting entity i (step 3-2), generating a common cryptokey Kij which is common to the transmitting entity i and the receiving entity j.

Figure 7:
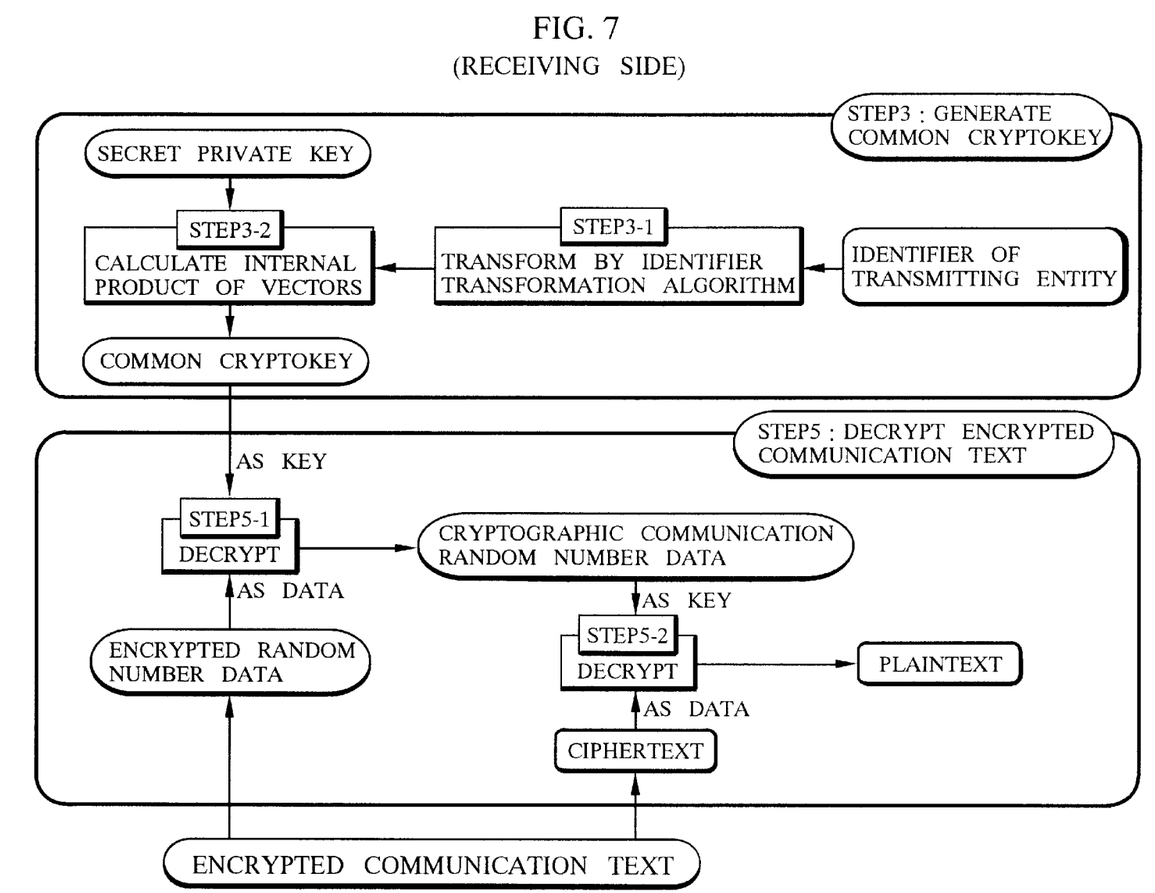
FIG. 7 is a flowchart showing details of steps 3 and 5 in the operation sequence shown in FIG. 3.

Similarly, as shown in FIG. 7, the receiving entity j applies the identifier transformation algorithm of the entity j on the computer of the entity j to the identifier yi of the transmitting entity i (step 3-1), and then calculates an inner product of the vector data generated in the step 3-1 and the secret private key Xj of the receiving entity j (step 3-2), generating a common cryptokey Kji which common to the receiving entity j and the transmitting entity i.

The common cryptokey Kij independently generated by the transmitting entity i and the common cryptokey Kji independently generated by the receiving entity j are the same as each other.

Specifically, the secret private keys Xi, Xj held respectively by the transmitting and receiving entities i, j are vector data produced by applying the Fourier transformation algorithm with a weighting function, the center matrix, and the randomization to the identifiers yi, yj of the respective entities i, j, and the identifier transformation algorithm which is applied to the identifiers yj, yi of the respective other entities j, i for the entities i, j to generate the common cryptokeys Kij, Kji is produced by combining the Fourier transformation algorithm with a weighting function and the algorithm for canceling out the elements of the random transformation for each of the entities i, j, which are reflected in the secret private keys X, Xj.

Therefore, when the inner product is calculated in the step 3-2, the effect of the random transformation for each of the entities i, j is eliminated, and the common cryptokeys Kij, Kji obtained as a result of the calculations to produce the inner product are equal to inner products of vector data which are generated by applying the Fourier transformation algorithm with a weighting function and further the center matrix to the identifiers yi, yj of the respective entities i, j and vector data which are generated by applying the Fourier transformation algorithm with a weighting function to the identifiers yj, yi of the respective other entities j, i. Stated otherwise, if it is assumed that the vector data generated by applying the Fourier transformation algorithm with a weighting function to the identifiers yi, yj are represented by yj', yi' (yi', yj' are column vectors) and the center matrix by C, then the common cryptokeys Kij, Kji are expressed respectively by $Kij=(yj')^T \cdot C \cdot yi'$, $Kji=(yi')^T \cdot C \cdot yj'$ where T represents transpose.

Since the center matrix c is a symmetric matrix, the common cryptokeys Kij, Kji are obviously equal to each other (Kij=Kji). Therefore, the common cryptokeys Kij, Kji which are separately generated by the respective entities i, j coincide with each other, so that the entities i, j can share the common cryptokey.

After having generated the common cryptokey Kij which is common to the transmitting and receiving entities i, j in the step 3 in FIG. 3, the transmitting entity i generates an encrypted communication text from the common cryptokey Kij and a plaintext (sentences, a program, etc.) to be transmitted to the receiving entity j (step 4). For generating the encrypted communication text, the transmitting entity i uses the common cryptokey Kij and one-time pass random number data.

Specifically, for generating a ciphertext, as shown in FIG. 6, the transmitting entity i generates one-time pass random number data (hereinafter referred to as "cryptographic communication random number data") based on the timing of entered data, i.e., times or time intervals at which words of a phrase or sentence are manually entered into the computer of the transmitting entity i, (step 4-1). Then, the transmitting entity i encrypts the one-time pass cryptographic communication random number data using the common cryptokey Kij as an intrinsic key (step 4-2). This encryption process is carried out according to a three-stage DES (Data Encryption Standard), for example.

The transmitting entity i also encrypts a plaintext using the one-time pass cryptographic communication random number data (prior to being encrypted) generated in the step 4-1, as a key (step 4-3). This encryption process is carried out according to a three-stage DES, for example, as is the case with the encryption process in the step 4-2.

The encrypted random number data generated in the step 4-2 and the encrypted plaintext generated in the step 4-3 are combined into one set, thereby generating an encrypted communication text to be transmitted to the receiving entity j. The encrypted communication text thus generated is thereafter transmitted from the computer of the entity i to the computer of the entity j.

The cryptographic communication random number data should preferably be generated and updated each time a cryptographic communication process is carried out. However, the cryptographic communication random number data may be updated each time several cryptographic communication processes are carried out, i.e., the same cryptographic communication random number data are used in the several cryptographic communication processes.

After having received the encrypted communication text, the receiving entity j decrypts the encrypted communication text using the common cryptokey Kji (=Kij) which is common to the entities i, j for finally producing the plaintext (step 5 in FIG. 7).

Specifically, as shown in FIG. 7, the receiving entity j uses the common cryptokey Kji (=Kij) as an intrinsic key to decrypt the encrypted random number data of the received encrypted communication text into encrypted communication random number data (step 5-1). Then, using the decrypted cryptographic communication random number data as a key, the receiving entity j decrypts the ciphertext of the encrypted communication text back into the plaintext (step 5-2). The receiving entity j can finally comprehend the contents of the plaintext from the transmitting entity i. The cryptographic communication process between the entities i, j is now completed.

Figure 8:
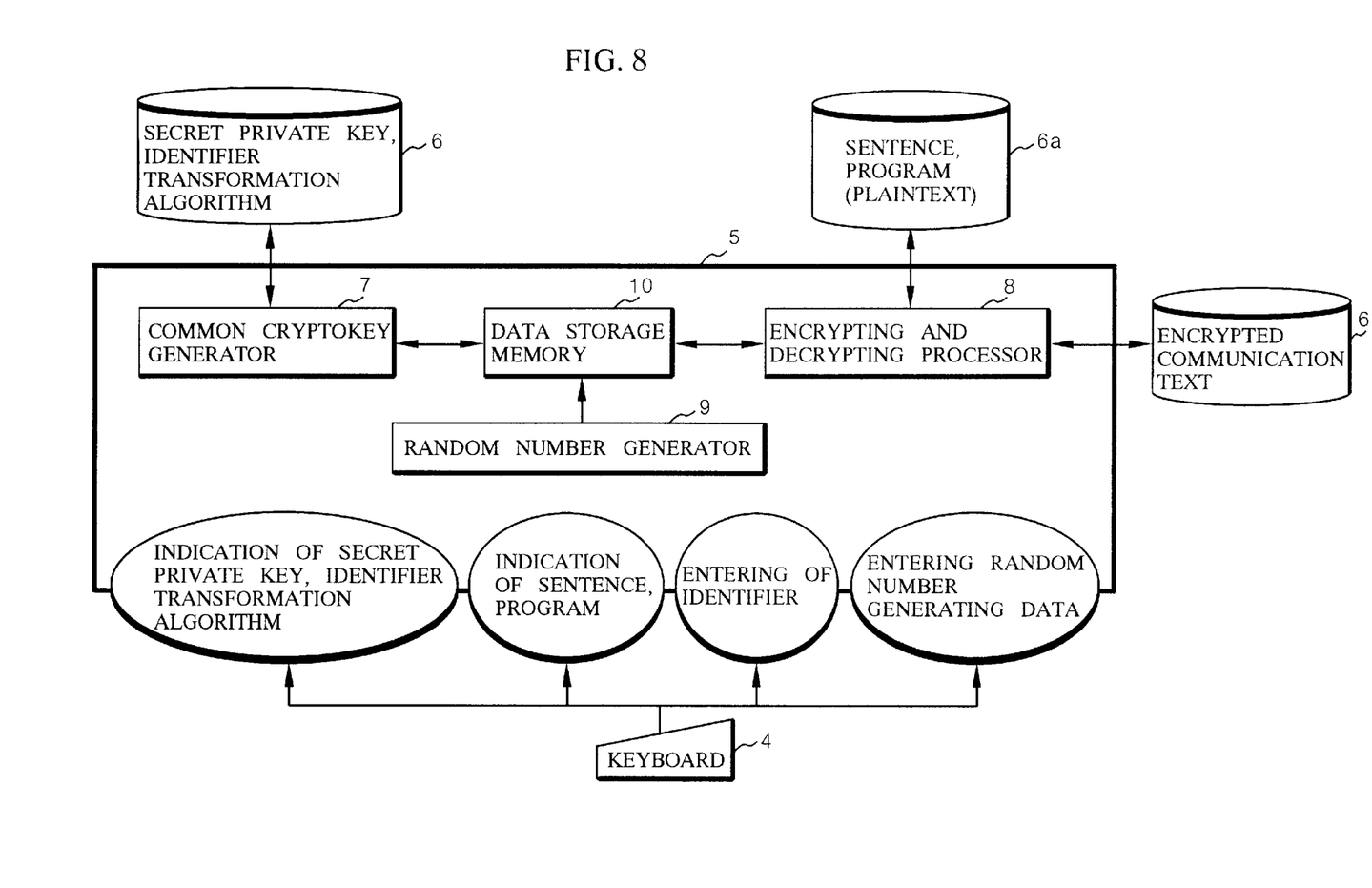
FIG. 8 is a block diagram of a computer for carrying out the steps shown in FIGS. 6 and 7.

The computer of each of the entities 2 for carrying out the above processing for cryptographic communications is shown in block form in FIG. 8.

As shown in FIG. 8, the computer of each of the entities 2 comprises a keyboard 4, a main unit 5 made up of a CPU, a RAM, a ROM, etc., and a data base 6 comprising a hard disk or the like for storing the secret private key xn, the identifier transformation algorithm, plaintexts such as sentences, programs, etc., and encrypted communication texts. The main unit 5 comprises as its functions a common key generator 7 for generating a common key, an encrypting and decrypting processor 8 for encrypting and decrypting communication data, a random number generator 9 for generating cryptographic communication random number data, and a data storage memory 10 for storing a common cryptokey generated by the common key generator 7 and data such as cryptographic communication random number data generated by the random number generator 9.

The computer of each of the entities 2 operates to carry out the above process of cryptographic communications as follows:

For generating a common cryptokey (the step 3), the secret private key Xn and the identifier transformation algorithm which are to be used are indicated from the keyboard 4 to the main unit 5 of the computer of each of the transmitting and receiving entities. The secret private key Xn and the identifier transformation algorithm which have been indicated are read from the database 6 to the common key generator 7 in the main unit 5. The identifier yn of the other entity with which to communicate is entered from the keyboard 4 into the main unit 5. The common key generator 7 applies the identifier transformation algorithm and the secret private key Xn to the data of the entered identifier yn, generating a common cryptokey (the steps 3-1, 3-2). The generated common cryptokey is then stored in the data storage memory 10.

In the computer of the transmitting entity, data (entered data of a phrase, a sentence, or the like) for generating cryptographic communication random number data are entered from the keyboard 4 into the main unit 5. Based on the entered data, the random number generator 9 generates one-time pass cryptographic communication random number data (the step 4-1) and stores the generated cryptographic communication random number data in the data storage memory 10.

In the computer of the transmitting entity, a plaintext to be transmitted in the database 6a is indicated by the keyboard 4 to the main unit 5, and the indicated plaintext is read from the database 6a to the encrypting and decrypting processor 8. The encrypting and decrypting processor 8 encrypts the cryptographic communication random number data stored in the data storage memory 10 using the common cryptokey stored in the data storage memory 10 (the step 4-2), and also encrypts the plaintext using the cryptographic communication random number data as a key (the step 4-3). The encrypted random number data and the encrypted plaintext or ciphertext are held as an encrypted communication text in the database 6b, and thereafter transmitted to the computer of the receiving entity.

In the computer of the receiving entity, the received encrypted communication text is held in the database 6b, and then read to the encrypting and decrypting processor 8. The encrypting and decrypting processor 8 decrypts the encrypted random number data in the encrypted communication text back to the cryptographic communication random number data using the common cryptokey stored in the data storage memory 10 (the step 5-1), and also decrypts the encrypted plaintext in the encrypted communication text back to the original plaintext using the decrypted cryptographic communication random number data as a key (the step 5-2). The plaintext thus decrypted by the encrypting and decrypting processor 8 is held in the database 6.

As described above, in the cryptosystem according to the present invention, when the secret private key Xn of each entity 2 is generated in the preparatory stage by the center 1, the identifier yn, such as a name, of the entity 2 is subjected to a Fourier transformation as the integral transformation. Therefore, even if many of the identifiers yn of the respective entities are analogous each other, data produced when those identifiers yn are subjected to the Fourier transformation are well dispersed, and hence the secret private keys Xn generated when those data are subjected to the center matrix are also highly dispersed. As a consequence, the center algorithm comprising the center matrix, etc. of the center 1 is made difficult to analyze even under the so-called differential attack.

The integral transformation may be a Laplace transformation, a Miller transformation, a Hilbert transformation, or the like, other than the Fourier transformation. However, the Fourier transformation (more specifically, the fast Fourier transformation) used as the integral transformation in the illustrated embodiment is effective to make the secret private keys Xn highly dispersive, and also to process the identifiers yn at high speed with the computer.

Since the weighting function is added in the center algorithm for generating the secret private key Xn, the data produced when the data of the identifier yn in the finite interval are subjected to the Fourier transformation are prevented from being abnormally dispersed. Furthermore, because the weighting function is added as an unknown algorithm element, in addition to the center matrix and the Fourier transformation algorithm, in the center algorithm for an unauthorized person who attempts to attack the center algorithm, it is highly difficult for such a person to analyze the center algorithm. The center algorithm remains highly difficult to analyze in view of the fact that the weighting function is generated in an unpredictable form using one-time pass random number data.

For generating the secret private key Xn, the identifier data are subjected to the center algorithm and also the randomization or random transformation based on one-time pass random number data peculiar to each entity 2. Consequently, the secret private key Xn of each entity 2 contains elements peculiar to each entity 2 and based on the random transformation which is not correlated to the random transformation for the other entities 2. Therefore, even when a plurality of entities 2 collaborate with each other in an attempt to analyze the center algorithm from the secret private keys Xn which are possessed by the respective collaborating entities 2, those entities 2 will find it extremely difficult to analyze the center algorithm. In the random transformation, the values of unnecessary bits of the data produced after the data of the identifier yn have been subjected to the Fourier transformation, the weighting function, and the center matrix are randomized by the one-time pass random number data, and then the randomized unnecessary bits and the useful bits are rearranged. It is very difficult for any attacking person to analyze the center algorithm because such a person is unable to recognize which part of the data of the secret private key xn contains those unnecessary bits. In addition, in order for an unauthorized cryptanalyst to break the cryptosystem completely, the unauthorized cryptanalyst has to analyze the four algorithms, i.e., the center matrix, the weighting function, the Fourier transformation (integral transformation), and the random transformation, based on the data of the secret private key Xn, etc. Actually, it is impossible to analyze all the four algorithms.

For generating a common cryptokey for cryptographic communications in the cryptosystem, the identifier transformation algorithm including an algorithm for canceling out the elements of the random transformation which are reflected in the secret private key Xn has to be distributed, together with the secret private key Xn, to each entity 2. However, since the identifier transformation algorithm is a combination of the algorithm for canceling out the elements of the random transformation, the Fourier transformation algorithm, and the weighing function, it is also difficult to individually analyze the algorithm of the random transformation, the weighing function, and the Fourier transformation algorithm of the center algorithm of the center 1 from the identifier transformation algorithm.

Consequently, it is practically impossible to analyze the center algorithm of the center 1, which is most important for the security of the cryptosystem, from the secret private key Xn, etc. of each entity 2.

For carrying out cryptographic communications between any arbitrary entities i, j, a plaintext is not directly encrypted using the common cryptokey Kij, but is encrypted using, as a key, one-time pass cryptographic communication random number data having no localized features, and the cryptographic communication random number data as a key for decrypting the encrypted plaintext or a ciphertext are encrypted using the common cryptokey Kij. Therefore, even if a third party intercepts an encrypted communication text, the third party finds it difficult to analyze the common cryptokey Kij based on the encrypted communication text. Inasmuch as it is difficult to analyze the common cryptokey Kij, it is also difficult for the third party to acquire the information of the secret private key Xn of each entity 2 which is contained in the common cryptokey Kij and the information of the center algorithm which is contained in the secret private key Xn. The security of the plaintext is maintained as it is encrypted using the cryptographic communication random number data as a key.

The cryptosystem is therefore highly secure against various forms of attack. In cryptographic communications between any arbitrary entities i, j, the entities i, j can generate and share a common cryptokey Kij simply by applying their own secret private keys Xi, Xj and the identifier transformation algorithm to the other entity's identifiers yj, yi, without involving the center 1 and requiring previous communication between the entities i, j.

Accordingly, the cryptosystem is simple and highly versatile as well as highly secure. The idea that the identifier yn plays an important role in generating the common cryptokey Kij as described above is similar to the concept disclosed in "Identity-Based Cryptosystems and Signature Schemes/ Advances in Cryptography: Proceeding of CRYPTO '84/ Springer LNCS 196, 1985, pp. 47–53" by A. Shamir.

The effectiveness of the cryptosystem to which the method according to the present invention is applied discussed from a more theoretical standpoint will be described below.

In the cryptosystem, the secret private key of each entity 2 is generated and a common cryptokey is generated according to a linear transformation or scheme. Such a linear transformation will be described below.

It is assumed that Xif represents the secret private key of an entity i for the generation of a common cryptokey shared by f entities 2. According to a general concept for constructing the above linear scheme, an f-input symmetric transformation g (which is a symmetric function having f variables) is arbitrarily selected, and the secret private key Xif of the entity i is determined as an f−1-input transformation which satisfies an equation: $Xif(\xi_1, \ldots, \xi_{f-1}) = g(yi, \xi_1, \ldots, \xi_{f-1})$ with respect to the identifier yi of the entity i where ξ is a variable representing an arbitrary identifier. The linear transformation can be found so that the kernel of the f-input symmetric transformation g is in accord with a multilinear map (an f-linear map), and is basically defined in a vector space on a Galois field and generalized as a coset on a ring.

The cryptosystem is based on the assumption that f=2, and the above linear transformation is defined as follows:

It is assumed that the set of entities belonging to the center 1 is represented by E, the set of the identifiers of the entities by I, and the set of common cryptokeys by K (see FIG. 1), and that Q represents a commutative ring having a unit element, J a coset of an order m over the commutative ring Q, and K a coset of a higher order h over the commutative ring Q, the cosets J, K having elements as m- and h-column vectors, respectively. If the commutative ring Q is a field, then the cosets J, K are vector spaces having respective dimensions m, h. The order m is equal to the total number of identifiers.

It is also assumed that R represents a linear transformation for injective mapping from the coset I to the coset J, and will hereinafter be referred to as an "identity transformation". The identity transformation basically corresponds to the Fourier transformation with a weighting function (integral transformation) effected on the identifier data, and can further be expanded so as to include the random transformation, as described later on.

Based on the above assumptions, first, a symmetric Qth multilinear mapping (2-input symmetric transformation) g: $J_2 \to K$ from $J_2$ (a set of pairs of two elements of the coset J) to the set K of common cryptokeys is arbitrarily selected and determined. The symmetric Qth multilinear mapping g is equivalent to a transformation from any two arbitrary identity-transformed identifiers to a common cryptokey corresponding to the two arbitrary identity-transformed identifiers.

For a given identifier yi ($\in$ I), a matrix xi having h rows and m columns over the commutative ring Q is determined to satisfy the equation: $xi \cdot \eta = g(R(yi), \eta)$ where η represents an arbitrary m-column vector and is an element of the coset J.

Moreover, for the given identifier yi ($\in$ I), a 1-input transformation Xi(ξ) is formed to satisfy the equation: $Xi(\xi) = xi \cdot R(\xi)$ where ξ is an arbitrary element of the set I.

The 1-input transformation Xi(ξ) is a secret private key for the entity i, and is expressed by the following equation:

$$Xi(\xi) = Vi(R(\xi))$$

where a 1-input transformation Vi is defined as $Vi(\eta) = xi \cdot \eta$ using the above matrix xi.

If there are a plurality of centers, then "xi" in the equation $Vi(\eta) = xi \cdot \eta$ is replaced with the summation of the matrix xi determined as described above for each of the centers.

With the secret private key Xi thus defined, as can easily be seen from the above description, the equation: $Xa(yb) = Xb(ya)$ is satisfied for any arbitrary entities a, b $\in$ E, i.e., a common cryptokey $Xa(yb) = Xb(ya)$ is obtained when the entities a, b enter the other's identifiers yb, ya into their own secret private keys Xa, Yb.

Even if a multivariate polynomial is selected instead of the multilinear mapping g, such a multivariate polynomial is covered by the linear transformation of the present cryptosystem for the reasons that any arbitrary polynomial can be rewritten as a linear polynomial by an appropriate transformation of a set of unknowns and such a transformation can be absorbed in the identity transformation R. Moreover, some transformations are interpreted as a composition of a linear transformation and an operation such as an exponential function.

The performance of the linear transformation of the present cryptosystem and the role of the identity transformation R will be described below.

It is assumed that for an arbitrary transformation A, Cd(A) and Ce(A) represent the complexity of a description of the transformation A and the complexity of an evaluation of the transformation A, respectively. At this time, the above transformations Xi, R, Vi satisfy the following equation and inequality:

$$Cd(Xi) = Cd(R) + Cd(Vi),$$

$$Ce(Xi) \leq Ce(R) + Ce(Vi).$$

If the input (identifier) of the transformation Xi which represents a secret private key is described by w[bit], then the complexity Cd(Vi) of a description of the transformation Vi is expressed by:

$$Cd(Vi) = h \cdot m \cdot w[bit].$$

The complexity Ce(Vi) of an evaluation of the transformation Vi is expressed by:

$$Ce(Vi) = O(h \cdot m) \text{ [Q-operation]}$$

where $O(h \cdot m)$ [Q-operation] signifies an h·m order on the commutative ring Q and its value can be evaluated substantially by $O(w^2)$ [bit transformation], i.e., a $w^2$ order. When a small commutative ring Q (e.g., a Galois field GF[2]) is selected, the complexity Ce(Vi) is low in level.

Therefore, the complexity Cd(Xi) of a description of the transformation Xi and the complexity Ce(Xi) of an evaluation of the transformation Xi are largely due to the complexity Cd(R) of a description of the identity transformation R and the complexity Ce(R) of an evaluation of the transformation R.

A case in which one or more entities j attempting to break the cryptosystem use their secret private keys Xj will be described below.

Obviously, to break the cryptosystem completely means to determine the above multilinear mapping g: $J_2 \to K$. For breaking the cryptosystem completely, it is necessary that the center collaborate with the entity or entities or as many entities as the order of the multilinear mapping g (which is approximately equal to the total number m (=order of J) of identifiers) collaborate with each other. However, such a collaboration is impossible to achieve practically.

The possibility of determining a secret private key Xi of an entity i by some entities j will be discussed below. For this problem, the identity transformation R plays an important role as described below.

First, it can easily be derived that the statement "even if all entities j of a subset B of an entire set E of entities collaborate and the entities j∈B use the whole [Xj|j∈B] of their respective secret private keys Xj, they cannot obtain any useful information to determine a secret private key Xi of an arbitrary entity i in the set E-B" is equivalent to the statement "for each entity i in the set E-B, an identity transformation R(yi) is linearly independent of the whole {R(yj)|j∈B} of respective identity transformations R(yj) of the entities j in the subset B". Consequently, the security of the linear transformation of the present cryptosystem in terms of the information theory is reduced to the linear dependency of an arbitrary subset U of the set {R(yi)|i∈E}. Therefore, there is a strong relationship between linear transformations and linear-algebraic combinations. For evaluating the security of a linear transformation, it is important to consider a linear code LR={z∈$Q^n$|H·z=0} defined by a parity check matrix H=(R(y1), . . . , R(yn)) with m rows and n columns (n=#E=e: the total number of entities E), i.e., a set of codewords z expressed by an n-column vector over the commutative ring Q, the product of the n-column vector and the parity check matrix H being zero. It can easily be derived that the existence of a codeword z (∈LR) of Hamming weights s is equivalent to the fact that the secret private key Xi of a certain entity i can be derived by the collaboration of s−1 entities j.

Personalizing the identity transformation R, i.e., making the identity transformation R peculiar to each entity, renders the cryptosystem resistant to attempts to break the cryptosystem even with the collaboration of many entities. Specifically, if the identity transformation R(yi) of an entity i is linearly dependent on the set {R(yj)|j∈B} of identity transformations R(yj) of respective entities j (j∈B) trying to break the cryptosystem and R(yi)=ΣCj·R(yj) where Cj is a suitable coefficient, then, as can be seen from the above definition of secret private keys, the secret private key Xi of the entity i and the secret private keys Xi of the entities j (j∈B) satisfy the equation: Xi=ΣCj·Xj. Therefore, the set B of entities j trying to break the cryptosystem can easily know the secret private key Xi of the other entity i. However, when the identity transformation R is personalized, it is made peculiar to each entity, making it difficult for the set B of given entities j to find an entity j having an identifier yi capable of analyzing another secret private key Xi. Stated otherwise, the entities j of the set B are unable to comprehend which entity's secret private key Xi can be analyzed from the information of the secrete private keys Xj, etc. possessed by those entities j. Conversely, it is also difficult for an entity i having a given identifier yi to find a set B containing an identifier yj capable of analyzing its secret private key Xi. Therefore, even when an entity i having a secret private key Xi to be analyzed is identified, it is unable to recognize which entities may collaborate with each other to analyze the secret private key Xi. Thus, it is of essential importance to personalize the identity transformation R for the purpose of increasing the complexity and theoretical security of the cryptosystem.

Various linear transformations can be selected for personalization of the identity transformation R. Basically, techniques for personalizing the identity transformation R are roughly classified into two categories.

In one of the categories, an identity transformation R which corresponds to a linear code LR that is a well known algebraic or analytic geometric code is used. In the other class, the identity transformation R is personally randomized for each entity.

According to the former process, if the total number m of identifiers is increased for security, then the amount of necessary data tends to be enormous. For example, it is assumed that Q=GF(q): Galois field with a primitive element of α, h=1, β is the ξth power of α (logβ=ξ·logα), and R(ξ)=[1, β, $β^2$, . . . , $β^{m-1}]^T$, and I is encoded as {0, 1, 2, . . . , n−1}. Since this identity transformation R is not unidirectional, it is not a strict linear transformation. However, the identity transformation R corresponds to a linear transformation proposed in the previously mentioned article "An Optimal Class of Symmetric Key Generation Systems" by R. Blom. The linear code LR corresponds to the Reed-Solomon code. In this category, it is necessary that the total number n of entities in the network be smaller than "q" in the Galois field Q=GF(q). If this category is applied when n=$10^{12}$, then the minimum Q is GF($2^{40}$), requiring a very large amount of data.

The latter process in which the identity transformation R is randomized for each entity is a process which has been realized by the random transformation in the above embodiment. According to this process, even if the total number m of identifiers (which is equal to the total number n of entities in the present cryptosystem), there exist a number of identity transformations R which can be processed at high speed with a small amount of data.

According to a process similar to the process of deriving the well-known asymptotic Varshamov-Gilbert bound, the following relation is obtained:

$$m/n+r \leq \Phi(b/n)$$

where r=m·$\log_q$(q−1), Φ is a function defined by $$\Phi(u)=u·\log_q(q-1)-u·\log_q u-(1-u)\log_q(1-u).$$

In the above inequality, "b" represents the total number (=#B) of entities j attempting to break the cryptosystem.

The above inequality determines a limit for the total number b of entities j required to break the cryptosystem. The number b of entities which does not satisfy the above inequality indicates that the cryptosystem cannot be broken.

It is derived from the above inequality that with respect to arbitrary numbers m, b, even if at most b entities j collaborate with each other, there exist identity transformations R preventing the entities j from analyzing the secret private key Xi of another entity i. It can also been seen that the personal randomization of the identity transformation R results in a linearly independent structure while satisfying the above condition in many cases.

Therefore, the present cryptosystem is made highly secure by the personal randomization of the identity transformation R. Stated otherwise, the personal randomization of the identity transformation R increases the complexity Cd(R) of a description of the identity transformation R and the complexity Ce(R) of an evaluation of the transformation R, and also the complexity Cd(Xi) of a description of the transformation Xi and the complexity Ce(Xi) of an evaluation of the transformation Xi, thereby keeping the cryptosystem highly secure.

In reality, if Q=GF[2], m=8192, and h=64, then Cd(Xi)= 64 [Kbytes]. In this case, it is possible to effect cryptographic communications between two arbitrary entities in the cryptosystem including up to 10120 entities at maximum, using a common cryptokey of 160 bits. If a 32-bit CPU and 640-Kbyte memory are used at a clock of 200 MHz, then each secret private key can be calculated within 20 ms. This cryptosystem cannot be broken completely unless 8192 entities collaborate with each other. Because of personal randomization for each entity, unless at least 256 entities collaborate with each other, any information of the secret private key of another entity cannot be obtained.

In the above embodiment, the center matrix is established in addition to the weighting function and the Fourier transformation algorithm. However, the weighting function itself can be used as the center algorithm.

While the Fourier transformation is used as the integral transformation in the above embodiment, any of various other integral transformations such as a Laplace transformation, a Miller transformation, a Hilbert transformation, or the like may be used.

Although a certain preferred embodiment of the present invention has been shown and described in detail, it should be understood that various changes and modifications may be made therein without departing from the scope of the appended claims.

What is claimed is:

1. A method of sharing a common cryptokey for encrypting and decrypting communication data between entities in a network which includes a plurality of entities and a center, comprising the steps of:

assigning a peculiar identifier to each entity, said identifier being public;

generating, in said center, a secret private key peculiar to each of the entities by transforming said identifier according to a center algorithm which is held by said center only and common to the entities and which includes an integral transformation algorithm, said integral transformation algorithm including an integral transformation algorithm with a weighting function added thereto, said weighting function being determined in an unpredictable pattern by random number data generated in said center, and distributing, from the center, the secret private key and said integral transformation algorithm to each of the entities; and when the entities communicate with each other, applying, in each of the entities, said integral transformation algorithm and said secret private key which are possessed by each of the entities to the identifier of the other entity thereby to generate a common cryptokey, so that the entities will possess the common cryptokey shared by the entities.

2. A method according to claim 1, wherein said random number data comprise one-time pass random number data.

3. A method according to claim 1, wherein said integral transformation algorithm comprises a Fourier transformation algorithm.

4. A method according to claim 1, further comprising the steps of:

randomizing, in said center, the identifier transformed by said center algorithm, with one-time pass personal random number data which are peculiar and unknown to each of the entities, thereby to generate said secret private key, and distributing, from said center, an algorithm for canceling out the elements of the randomization which are contained in said secret private key and an identifier transformation algorithm which comprises said integral transformation algorithm, to each of the entities; and when the entities communicate with each other, applying, in each of the entities, said identifier transformation algorithm and said secret private key which are possessed by each of the entities to the identifier of the other entity thereby to generate said common cryptokey, so that the entities will possess the common cryptokey shared by the entities.

5. A method according to claim 4 further comprising the step of generating said one-time pass personal random number data according to a given process of each of the entities.

6. A method according to claim 5, wherein said given process comprises a manual data entering process, and further comprising the step of generating said one-time pass personal random number data based on the timing of said manual data entering process.

7. A method according to claim 4, further comprising the step of randomizing said identifier transformed by said center algorithm by rearranging a sequence of data representing the identifier transformed by said center algorithm, with said one-time pass personal random number data.

8. A method according to claim 7, wherein said sequence of data contains a plurality of unnecessary bits, and further comprising the steps of:

randomizing said identifier transformed by said center algorithm by randomizing the values of said unnecessary bits with said one-time pass personal random number data; and rearranging the sequence of data, including said unnecessary bits, in its entirety.

9. A method of sharing a common cryptokey for encrypting and decrypting communication data between entities in a network which includes a plurality of entities and a center, comprising the steps of:

assigning a peculiar identifier to each entity, said identifier being public;

generating, in said center, a secret private key peculiar to each of the entities by transforming said identifier according to a center algorithm which is held by said center only and common to the entities, and then randomizing the transformed identifier with one-time pass personal random number data which are peculiar and unknown to each of the entities, and distributing, from the center, the secret private key and an identifier transformation algorithm which includes an algorithm for canceling out the elements of the randomization which are contained in said secret private key to each of the entities; and when the entities communicate with each other, applying, in each of the entities, said identifier transformation algorithm and said secret private key which are possessed by each of the entities to the identifier of the other entity thereby to generate a common cryptokey, so that the entities will possess the common cryptokey shared by the entities.

10. A method according to claim 9 further comprising the step of generating said one-time pass personal random number data according to a given process of each of the entities.

11. A method according to claim 10, wherein said given process comprises a manual data entering process, and further comprising the step of generating said one-time pass personal random number data based on the timing of said manual data entering process.

12. A method according to claim 9, further comprising the step of randomizing said identifier transformed by said center algorithm by rearranging a sequence of data representing the identifier transformed by said center algorithm, with said one-time pass personal random number data.

13. A method according to claim 12, wherein said sequence of data contains a plurality of unnecessary bits, and further comprising the steps of:

randomizing said identifier transformed by said center algorithm by randomizing the values of said unnecessary bits with said one-time pass personal random number data; and rearranging the sequence of data, including said unnecessary bits, in its entirety.

* * * * *